US012020587B2

(12) United States Patent
Collin et al.

(10) Patent No.: US 12,020,587 B2
(45) Date of Patent: Jun. 25, 2024

(54) CUEING DEVICE AND METHOD FOR TREATING WALKING DISORDERS

(71) Applicant: DE ORO DEVICES, INC., San Luis Obispo, CA (US)

(72) Inventors: Sidney Collin, San Luis Obispo, CA (US); Adam Schwartz, San Luis Obispo, CA (US); William Thompson, San Luis Obispo, CA (US)

(73) Assignee: DE ORO DEVICES, INC., San Luis Obispo, CA (US)

( * ) Notice: Subject to any disclaimer, the term of this patent is extended or adjusted under 35 U.S.C. 154(b) by 0 days.

(21) Appl. No.: 18/180,494

(22) Filed: Mar. 8, 2023

(65) Prior Publication Data
US 2023/0222939 A1 Jul. 13, 2023

Related U.S. Application Data

(63) Continuation of application No. 16/570,155, filed on Sep. 13, 2019, now Pat. No. 11,790,804.

(60) Provisional application No. 62/731,713, filed on Sep. 14, 2018.

(51) Int. Cl.
G09B 19/00 (2006.01)
(52) U.S. Cl.
CPC .................. G09B 19/003 (2013.01)
(58) Field of Classification Search
CPC .................. G09B 19/003
See application file for complete search history.

(56) References Cited

U.S. PATENT DOCUMENTS

| 3,093,914 | A | * | 6/1963 | Bernstein | G09B 19/04 |
| | | | | | D19/64 |
| 5,538,268 | A | * | 7/1996 | Miller | B62B 5/02 |
| | | | | | 482/68 |
| 5,575,294 | A | | 11/1996 | Perry et al. | |
| 5,794,203 | A | | 8/1998 | Kehoe | |
| 5,919,149 | A | | 7/1999 | Allum | |
| 6,788,976 | B2 | | 9/2004 | Gesotti | |
| 7,254,516 | B2 | * | 8/2007 | Case, Jr. | A63B 24/0075 |
| | | | | | 702/182 |
| 7,369,869 | B2 | | 5/2008 | Wiatrowski et al. | |

(Continued)

FOREIGN PATENT DOCUMENTS

CN 102530762 A * 7/2012
CN 103115258 A * 5/2013
(Continued)

OTHER PUBLICATIONS

Apinex: Mounted Laser Light for Parkinson's Disease. https://www.apinex.com/ret2/LLM-219CR-R.html (2019).
(Continued)

Primary Examiner — Xuan M Thai
Assistant Examiner — Sadaruz Zaman
(74) Attorney, Agent, or Firm — Lieberman & Brandsdorfer, LLC

(57) ABSTRACT

Devices used to cue a user to take a step when experiencing a walking disorder, such as a freezing of gait episode, are disclosed. The devices are configured to cue the user with a visual and/or audible cue. The devices include an activation module and a cueing module. The cueing module includes a metronome and a laser light source. The devices are mounted on an assistive mobility device or on the user.

22 Claims, 7 Drawing Sheets

(56) References Cited

U.S. PATENT DOCUMENTS

| | | | |
|---|---|---|---|
| 7,370,533 B2 | 5/2008 | Davis | |
| 7,398,791 B2 | 7/2008 | Tucker | |
| 7,484,740 B2* | 2/2009 | Miller | A61H 3/04 135/65 |
| 8,409,116 B2 | 4/2013 | Wang et al. | |
| 8,460,219 B2 | 6/2013 | Miyake | |
| 8,674,838 B2 | 3/2014 | Konishi et al. | |
| 8,702,567 B2* | 4/2014 | Hu | A63B 24/0062 600/595 |
| 8,845,494 B2 | 9/2014 | Whitall et al. | |
| 8,961,186 B2* | 2/2015 | LoSasso | A63B 22/20 434/255 |
| 9,125,790 B2 | 9/2015 | Van Gerpen | |
| 9,517,378 B2* | 12/2016 | Ashby | A63B 22/0242 |
| 9,704,412 B2* | 7/2017 | Wells | G16H 20/40 |
| 9,763,849 B2* | 9/2017 | Paterson | A61H 3/04 |
| 9,808,391 B1* | 11/2017 | Carrig | G08B 21/0233 |
| 9,812,031 B1* | 11/2017 | Wahrmund | G09B 19/003 |
| D807,793 S * | 1/2018 | Paterson | D12/130 |
| 9,861,549 B2* | 1/2018 | Karlovich | A63B 22/02 |
| 10,080,701 B1* | 9/2018 | Bagheri | A61H 3/008 |
| D834,458 S * | 11/2018 | Paterson | D12/130 |
| 10,242,590 B2* | 3/2019 | Yu | A61B 5/486 |
| 10,251,611 B2 | 4/2019 | Marsh et al. | |
| 10,493,350 B2* | 12/2019 | DeMarch | G09B 19/003 |
| 10,588,814 B1* | 3/2020 | Engel | A61M 21/00 |
| 11,337,875 B2* | 5/2022 | Wilson | A61G 7/1046 |
| 11,450,226 B2* | 9/2022 | Derickson | G06N 5/04 |
| 2002/0107556 A1* | 8/2002 | Mcloul | A61H 1/00 607/48 |
| 2004/0069821 A1* | 4/2004 | Kobayashi | F41C 33/045 224/272 |
| 2006/0025836 A1 | 2/2006 | Van Gerpen et al. | |
| 2006/0292533 A1* | 12/2006 | Selod | A63B 71/0686 434/247 |
| 2007/0233403 A1 | 10/2007 | Alwan et al. | |
| 2007/0255186 A1* | 11/2007 | Grill | A61H 3/00 600/595 |
| 2010/0075806 A1* | 3/2010 | Montgomery | G09B 19/003 600/23 |
| 2010/0100013 A1 | 4/2010 | Hu et al. | |
| 2012/0101411 A1 | 4/2012 | Hausdorff et al. | |
| 2013/0014790 A1 | 1/2013 | Van Gerpen | |
| 2013/0015969 A1 | 1/2013 | Su et al. | |
| 2013/0171598 A1* | 7/2013 | LoSasso | G09B 23/28 434/247 |
| 2014/0171834 A1 | 6/2014 | DeGoede et al. | |
| 2014/0249452 A1 | 9/2014 | Marsh et al. | |
| 2016/0253890 A1* | 9/2016 | Rabinowitz | A61B 5/1112 340/539.13 |
| 2016/0262661 A1 | 9/2016 | Sarkar et al. | |
| 2016/0345868 A1 | 12/2016 | Rost | |
| 2017/0296116 A1 | 10/2017 | McCarthy et al. | |
| 2018/0008797 A1* | 1/2018 | Kozloski | B64C 39/024 |
| 2018/0140842 A1 | 5/2018 | Olaighin et al. | |
| 2018/0178065 A1* | 6/2018 | Yu | A61H 3/04 |
| 2018/0289287 A1 | 10/2018 | Sio et al. | |
| 2019/0352940 A1 | 11/2019 | Mack | |
| 2020/0090545 A1 | 3/2020 | Collin et al. | |
| 2023/0102689 A1* | 3/2023 | Collin | G16H 20/30 434/255 |

FOREIGN PATENT DOCUMENTS

| | | |
|---|---|---|
| DE | 102015011472 | 3/2017 |
| DE | 102015011472 A1 | 3/2017 |
| EP | 3360064 A1 | 8/2018 |
| JP | 2005231329 A | 9/2005 |
| JP | 2017525524 A | 9/2017 |
| WO | WO-0177761 A1 | 10/2001 |
| WO | WO-2014158373 A1 | 10/2014 |
| WO | WO-2015119630 A1 | 8/2015 |
| WO | WO-2021188699 A1 | 9/2021 |

OTHER PUBLICATIONS

Bonanza: Laser Cane with Audio Step Counter & Inactivity Timer for Parkinson's Disease. http://www.bonanza.com/listings/laser-cane-with-audio-step-counter-inactivity-timer-for-parkinson-s-disease/714602714?goog_pla=1&gpid=2939467 (2019).

Chinese Patent Application No. 2019800742981 First Office Action dated Feb. 16, 2023.

European Patent Application No. 19861003.2 Extended European Search Report dated May 13, 2022.

Goncalves et al.: Literature review of vibrotactile systems addressing freezing of gait in parkinsonians. IEEE International Conference on Autonomous Robot Systems and Competitions. pp. 104-109 (2017).

Lopez et al.: Listenmee and Listenmee smartphone application: Synchronizing walking to rhythmic auditory cues to improve gait in Parkinson's disease. Human Movement Science. Elsevier, Amsterdam. 37:147-156 (2014).

McCandless et al.: Effect of Three Cueing Devices for People with Parkinson's Disease with Gait Initiation Difficulties. Europe PMC Funders Group. Gait Posture. 44:7-11 (2016).

PCT/US2019/051025 International Preliminary Report on Patentability dated Mar. 25, 2021.

PCT/US2019/051025 International Search Report and Written Opinion dated Dec. 4, 2019.

PCT/US2021/022797 International Invitation to Pay Additional Fees dated May 18, 2021.

PCT/US2021/022797 International Preliminary Report on Patentability dated Sep. 29, 2022.

PCT/US2021/022797 International Search Report and Written Opinion dated Jul. 27, 2021.

Sweeney et al.: A Technological Review of Wearable Cueing Devices Addressing Freezing of Gait in Parkinson's Disease. Sensors (Basel). 19(6):1277 (2019).

U.S. Appl. No. 16/570,155 Office Action dated Mar. 9, 2022.

U.S. Appl. No. 16/570,155 Office Action dated Sep. 19, 2022.

Japanese Application No. 2021-513273 Office Action dated Apr. 26, 2023.

KR Office Action (Translation), Dec. 20, 2023.

* cited by examiner

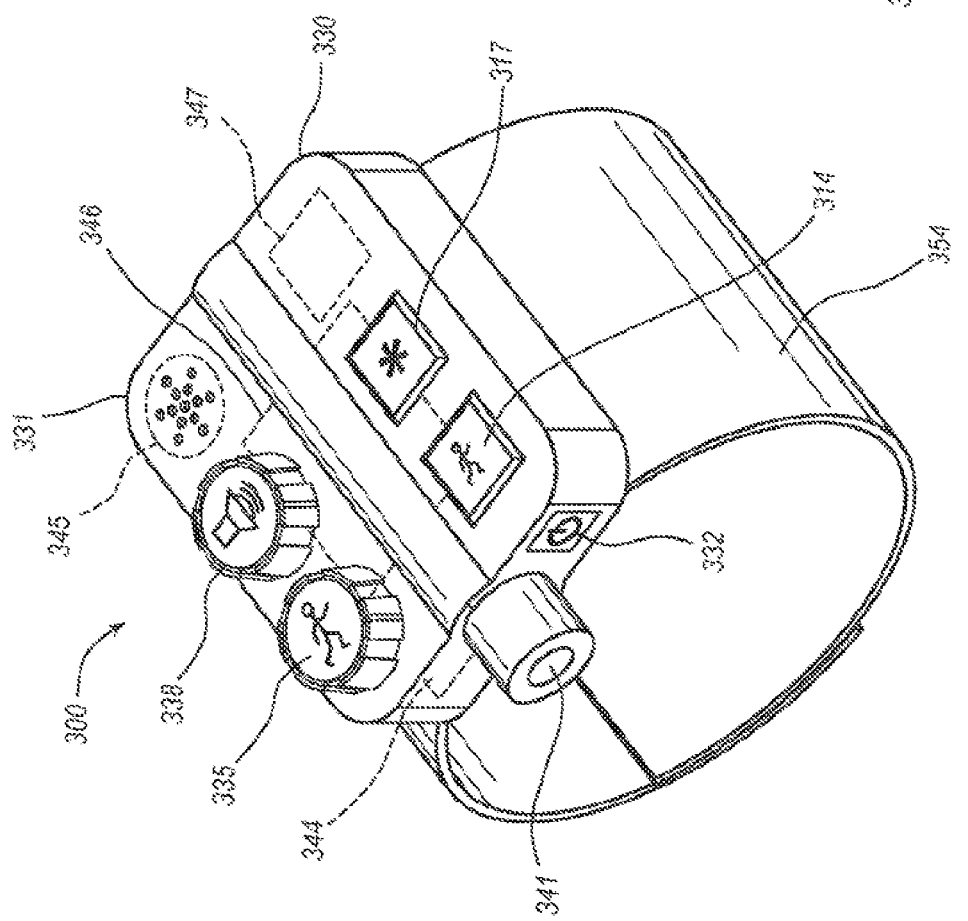
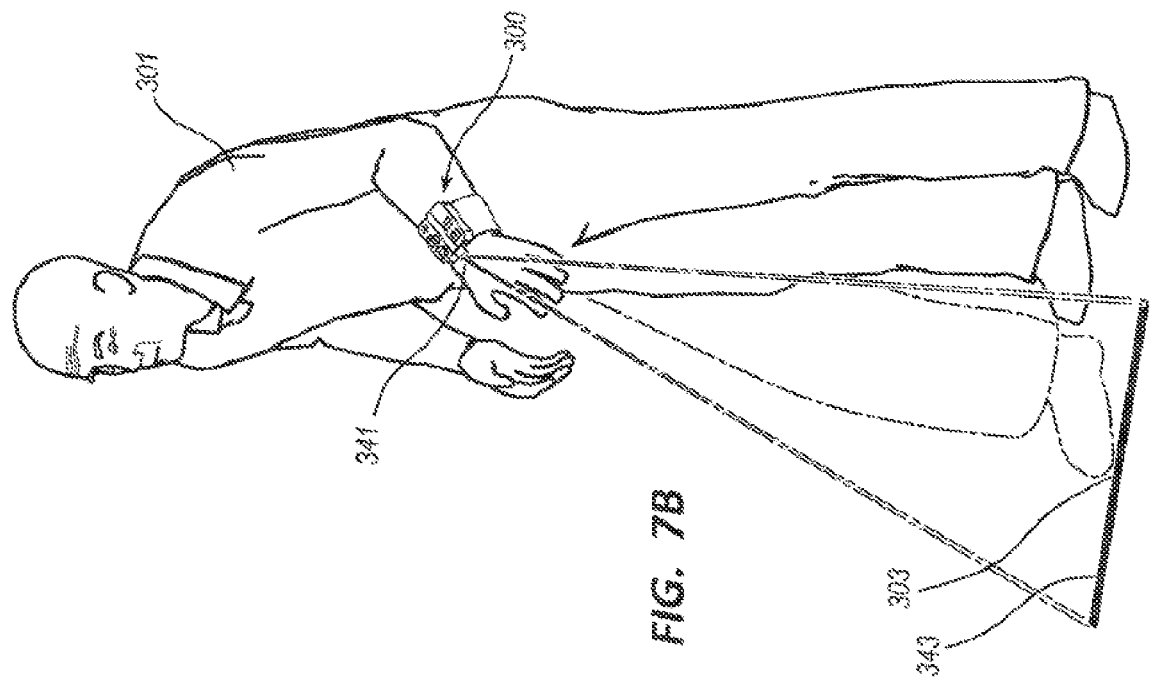

ated. Two components

CUEING DEVICE AND METHOD FOR TREATING WALKING DISORDERS

CROSS-REFERENCE

This application is a continuation of U.S. patent application Ser. No. 16/570,155, filed on Sep. 13, 2019, which claims the benefit of U.S. Provisional Application No. 62/731,713, filed on Sep. 14, 2018, both of which are hereby incorporated by reference in their entirety.

SUMMARY

Some aspects of the present disclosure provide a device for treatment of a walking disorder, comprising: an activation module comprising: an audible cueing activation switch; and a visual cueing activation switch; and a cueing module comprising: a cadence control potentiometer, a volume control potentiometer; and a laser light source.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

FIG. 7A is a perspective view of another embodiment of a cueing device.

FIG. 7B is a perspective view of the curing device of FIG. 7A mounted to a wrist of a user.

DETAILED DESCRIPTION

Figure 1:
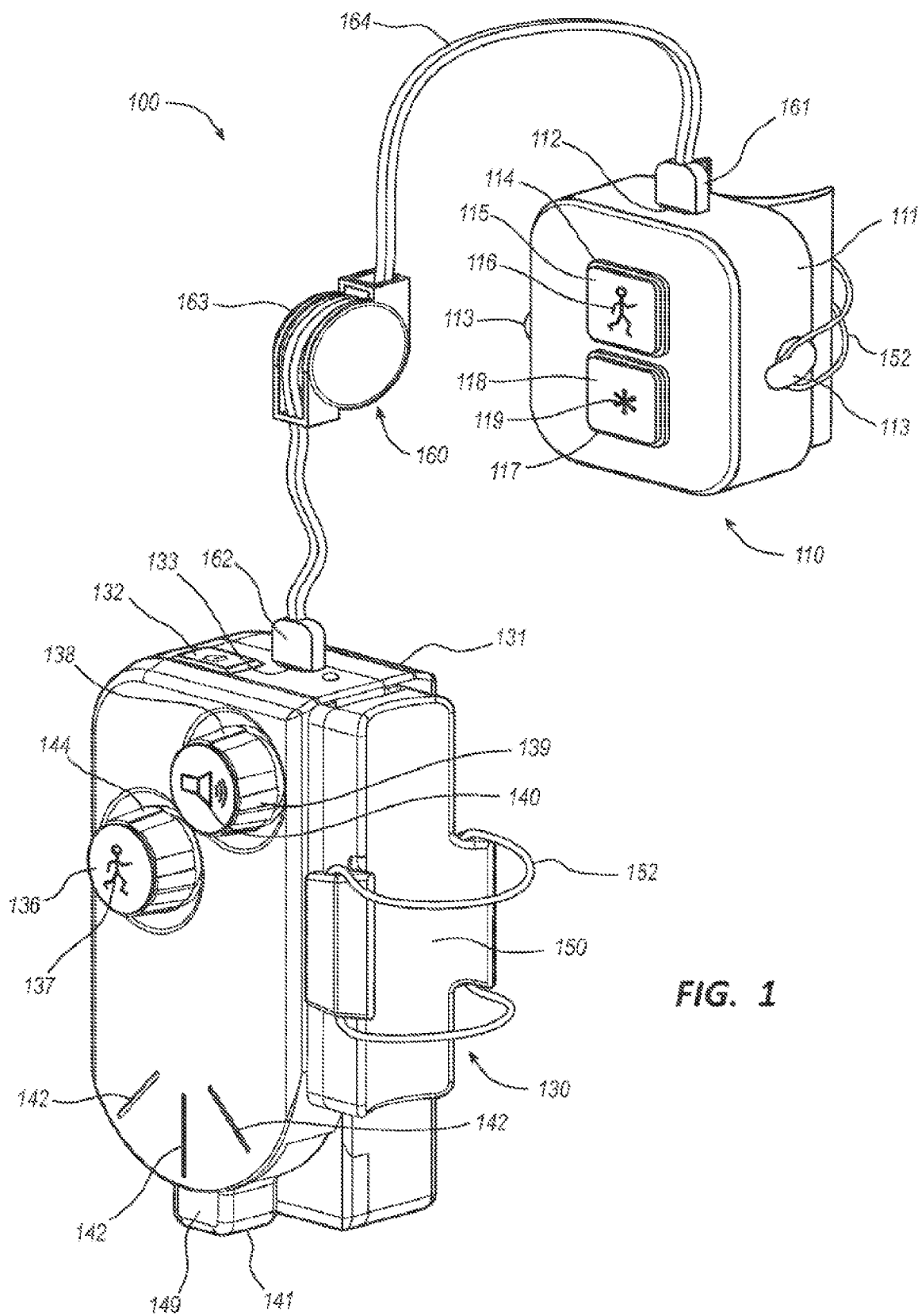
FIG. 1 is a perspective view of an embodiment of a cueing device.

Gait irregularities, such as freezing of gait (FOG) or akinesia, can occur in people who suffer from neurological diseases such as Parkinson's disease, cerebral palsy, and multiple sclerosis. Particularly for sufferers of Parkinson's disease, gait irregularity typically occurs when walking in familiar surroundings and in tight corners or doorways, and typically occurs as a brief unexpected inability to walk. This not only interrupts daily life, but often causes accidents, such as falls.

An apparatus to mitigate FOG or other walking disorders may include a cueing device comprising an activation module and a cueing module. The activation module may be disposed adjacent a handle bar of an assistive mobility device such as a walker or cane such that the activation module is within easy reach of a user's fingers. The activation module may be configured to activate an audible cue and a visual cue. The audible cue may be a click or chirp from a metronome and the visual cue may be a line projected onto a walking surface by a laser light source. The cueing module may be adjustably coupled to a lower portion of a forward leg or back leg of the walker or a shaft of the cane. The cueing module may include a laser light source, a metronome, and a speaker. A potentiometer may control a cadence rate of the metronome and another potentiometer may control the volume output of the speaker. The laser light source may be adjustable relative to a longitudinal axis of the cueing module such that the position of the projected line relative to the user may be adjusted. An adjustable length cable may couple the activation module to the cueing module such that the modules are in electronic communication.

In use, the device to mitigate FOG may be coupled to an assistive mobility device with the activation module positioned adjacent the user's fingers and the cueing module above the walking surface. The device may be powered on by activating a power switch on the cueing module. The cadence rate of the metronome and the speaker volume may be adjusted to a suitable rate and volume by rotating a corresponding knob on the cueing module. The user may activate either the metronome or the laser light source or both by depressing a corresponding button on the activation module prior to initiating walking. Alternatively, the user may activate either the metronome or the laser light source or both after encountering a FOG episode.

Embodiments may be understood by reference to the drawings, wherein like parts are designated by like numerals throughout. It will be readily understood by one of ordinary skill in the art having the benefit of this disclosure that the components of the embodiments, as generally described and illustrated in the figures herein, could be arranged and designed in a wide variety of different configurations. Thus, the following more detailed description of various embodiments, as represented in the figures, is not intended to limit the scope of the disclosure, but is merely representative of various embodiments. While the various aspects of the embodiments are presented in drawings, the drawings are not necessarily drawn to scale unless specifically indicated.

It will be appreciated that various features are sometimes grouped together in a single embodiment, figure, or description thereof for the purpose of streamlining the disclosure. Many of these features may be used alone and/or in combination with one another.

The phrases "coupled to" and "in communication with" refer to any form of interaction between two or more entities, including mechanical, electrical, magnetic, electromagnetic, fluid, and thermal interaction. Two components may be coupled to or in communication with each other even though they are not in direct contact with each other. For example, two components may be coupled to or in communication with each other through an intermediate component.

The directional terms "distal" and "proximal" are given their ordinary meaning in the art. That is, the distal end of a medical device means the end of the device furthest from the practitioner or user during use. The proximal end refers to the opposite end, or the end nearest the practitioner during use. As specifically applied to the cueing module of a cueing device, the proximal end of the cueing module refers to the end away from the walking surface and the distal end refers to the opposite end, the end nearest the walking surface.

FIGS. 1-7B illustrate different views of several cueing devices and related components. In certain views each device may be coupled to, or shown with, additional components not included in every view. Further, in some views only selected components are illustrated, to provide detail into the relationship of the components. Some components may be shown in multiple views but not discussed in connection with every view. Disclosure provided in connection with any figure is relevant and applicable to disclosure provided in connection with any other figure or embodiment.

FIGS. 1-5 depict one embodiment of a cueing device 100. In the illustrated embodiment, the cueing device 100 includes three broad groups of components; each group may have numerous subcomponents and parts. The three broad component groups are: an activation module 110, a cueing module 130, and a cable 160.

Figure 2:
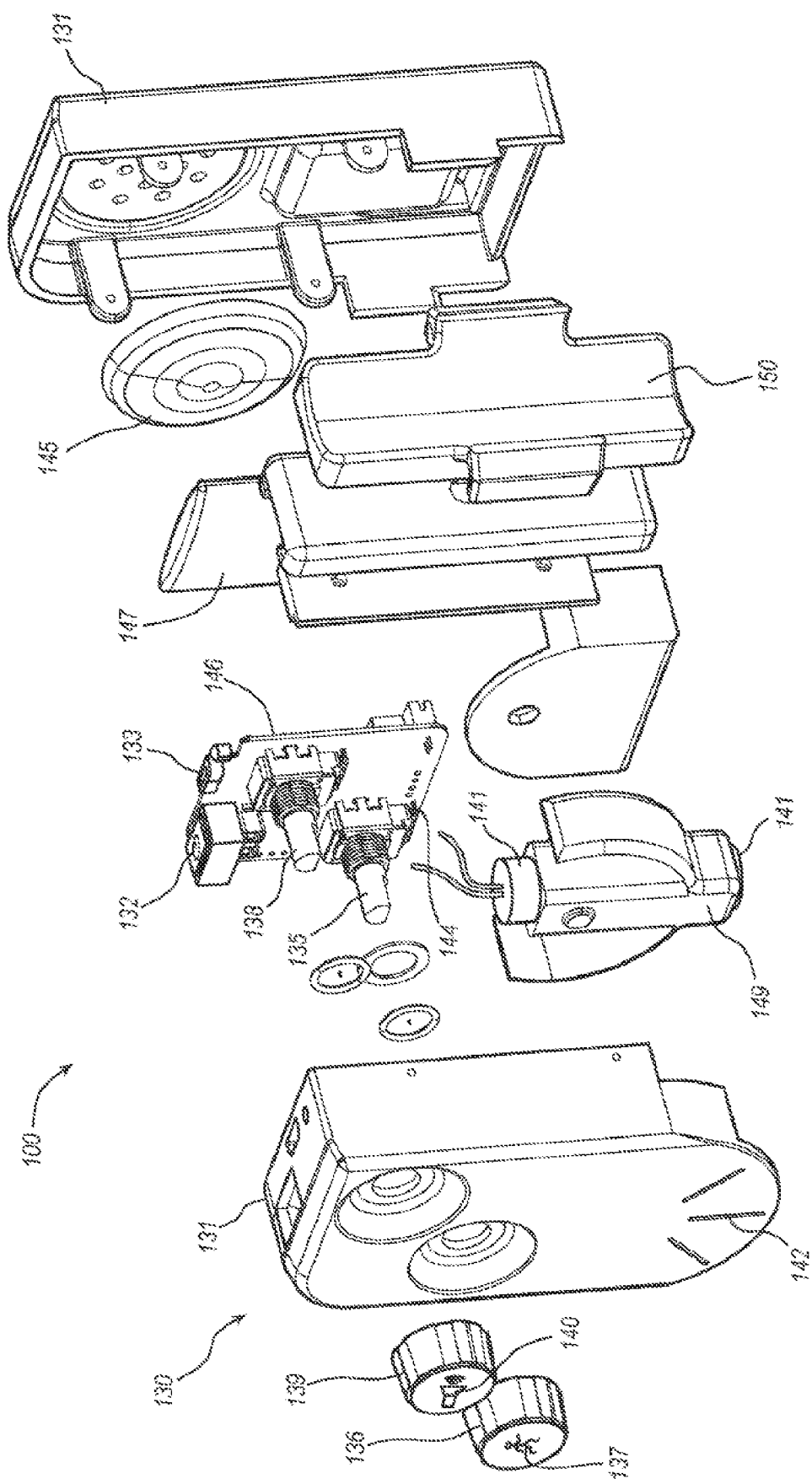
FIG. 2 is a perspective exploded view of cueing device of FIG. 1.

As illustrated in FIGS. 1-2, the activation module 110 includes a housing 111, an audible cueing activation switch or metronome activation switch 114, a visual cueing activation switch or laser light source activation switch 117, and a universal serial bus (USB) port 112. In other embodiments, the activation module 110 may include a music cueing activation switch. The housing 111 may be in a shape of a square box having side dimensions of about 1.25 inches and a depth dimension of about 0.75 inch or other suitable dimensions that are within the scope of this disclosure. In other embodiments, the housing 111 may be formed in the shape of a circle, a rectangle, an oval, or other geometries that are likewise within the scope of this disclosure. The housing 111 may include a front portion and a back portion that are coupled using any suitable technique, such as snap fit, friction fit, welding, bonding, etc. The housing 111 can be formed from any suitable plastic material, such as polycarbonate, polypropylene, acrylonitrile butadiene styrene, acrylic, polyurethane, etc., or metal material, such as steel, aluminum, etc. The housing 111 may be formed using any suitable manufacturing method, such as machining, thermal injection molding, reactive injection molding, thermoforming, stamping, casting, 3-D printing, multi jet fusion, etc.

The audible cueing activation switch 114 and the visual cueing activation switch 117 are disposed within the housing 111. The switches 114, 117 are configured to activate a metronome 144 and a laser light source 141 of the cueing module 130, respectively. The switches 114, 117 may each include a button 115, 118 disposed within the front portion of the housing 111. The buttons 115, 118 may be configured to be depressed by a user to engage the switches 114, 117 when activation of the metronome 144 and/or laser light source 141 is desired. An audible cueing activation indicium 116 may be disposed on the button 115 or adjacent the button 115 on the housing 111. The indicium 116 may represent a walking person or any other suitable image. A visual cueing activation indicium 119 may be disposed on the button 118 or adjacent the button 118 on the housing 111. The indicium 119 may represent a universal accepted symbol for a laser (e.g., starburst) or any other suitable image. In another embodiment, an indicator light may be disposed adjacent the buttons 115, 118 to provide indication of activation of the audible cueing activation switch 114 and/or the visual cueing activation switch 117. In other embodiments, the activation module 110 may be in electronic communication with an external control device such as a smart phone, tablet, etc. using any suitable wireless local area networking technique where the external control device is used to activate the metronome 144 and the laser light source 141.

The USB port 112 is disposed on a side of the housing 111. The USB port 112 is configured to couple with a USB connector 161 of the cable 160 such that the activation module 110 and the cueing module 130 are in electrical communication. In other embodiments, the activation module 110 and the cueing module 130 may be in wireless communication using any suitable wireless local area networking technique. In certain embodiments, the activation module 110 receives power from the cueing module 130 through the USB port 112. In other embodiments, the activation module 110 may include a power source (e.g., batteries).

The housing 111 includes mushroom-shaped projections 113 extending from opposite sides of the housing 111. The projections 113 may be configured to facilitate coupling of the activation module 110 to an assistive mobility device 180. (See FIGS. 4 and 5.) An elastomeric member 152 may be coupled to the projections 113 and extend around a portion of the assistive mobility device 180. In other embodiments, the projections 113 may be in the form of hooks, clips, elbows, etc. In still other embodiments, the projections 113 may comprise a hook-and-loop material configured to couple with a band of hook-and-loop material.

As depicted in the illustrated embodiment of FIGS. 1-2, the cueing module 130 includes a housing 131, the metronome 144, the laser light source 141, a power switch 132, a power source 147, a processor 146, a metronome potentiometer 135, a speaker 145, a speaker volume potentiometer 138, and a micro USB port 133. The housing 131 may be in a shape of a rectangular box having a length dimension of about 4.00 inches, a width dimension of about 2.00 inches, and a depth dimension of about 1.75 inches or other suitable dimensions that are within the scope of this disclosure. In other embodiments, the housing 131 may be formed in the shape of a circle, a rectangle, an oval, or other geometries that are likewise within the scope of this disclosure. The housing 131 may include a front portion and a back portion that are coup led using any suitable technique, such as snap fit, friction fit, welding, bonding, etc. The housing 131 can be formed from any suitable plastic material, such as polycarbonate, polypropylene, acrylonitrile butadiene styrene, acrylic, polyurethane, etc., or metal material, such as steel, aluminum, etc. The housing 131 may be formed using any suitable manufacturing method, such as machining, thermal injection molding, reactive injection molding, thermoforming, stamping, casting, 3-D printing, multi jet fusion, etc. The housing 131 may include a mounting bracket 150. In other embodiments, the housing 131 may include a slide disposed on a side of the housing 131. The slide may be configured to slidingly engage with the mounting bracket 150.

The metronome 144 is disposed within the housing 131 and electronically coupled to the audible cueing activation switch 114 of the activation module 110 via the cable 160. The metronome potentiometer 135 is coupled to the metronome 144 and configured to adjust a cadence rate output of the metronome 144. The metronome potentiometer 135 may be configured to adjust the cadence rate of the metronome 144 between about zero and about 250 beats per minute, between about 10 and about 100 beats per minute, and about 20 and about 100 beats per minute. A metronome potentiometer knob 136 is coupled to the metronome potentiometer 135 and is configured to be engaged by a user to adjust the cadence rate. An indicium 137 may be disposed on the knob 136 or adjacent the knob 136 on the housing 131. The indicium 137 may be an image of a walking person or other suitable images that are within the scope of this disclosure.

The speaker 145 may be disposed within the housing 131. The speaker 145 may be in electronic communication with the metronome 144 and the speaker volume potentiometer 138. The speaker volume potentiometer 138 can be configured to adjust an output volume of the speaker 145 from about 50 decibels to about 65 decibels. The output sounds from the metronome 144 through the speaker 145 may be pings, blips, chimes, dings, clicks, chirps, claves, agogos, etc. In another embodiment, the metronome 144 may be in communication with an external device such as headphones, ear buds, smart phone, tablet, hearing aids, etc. using any suitable wireless local area networking technique. A speaker volume potentiometer knob 139 is coupled to the metronome potentiometer 138 and is configured to be engaged by a user to adjust the output volume of the speaker 145. An indicium 140 may be disposed on the knob 139 or adjacent the knob 139 on the housing 131. The indicium 140 may be an image of a standard speaker symbol or other suitable images that are within the scope of this disclosure.

In other embodiments, the speaker 145 may be configured for output of music or other recorded sounds configured to provide a rhythm or beat. The music or other recorded sounds may be stored in memory of the processor 146; wirelessly communicated to the processor 146 from an external device such as a smartphone, tablet, etc. using any suitable local area networking technique; or stored in memory of an external memory storage device such as a USB memory stick or flash drive.

Figure 4:
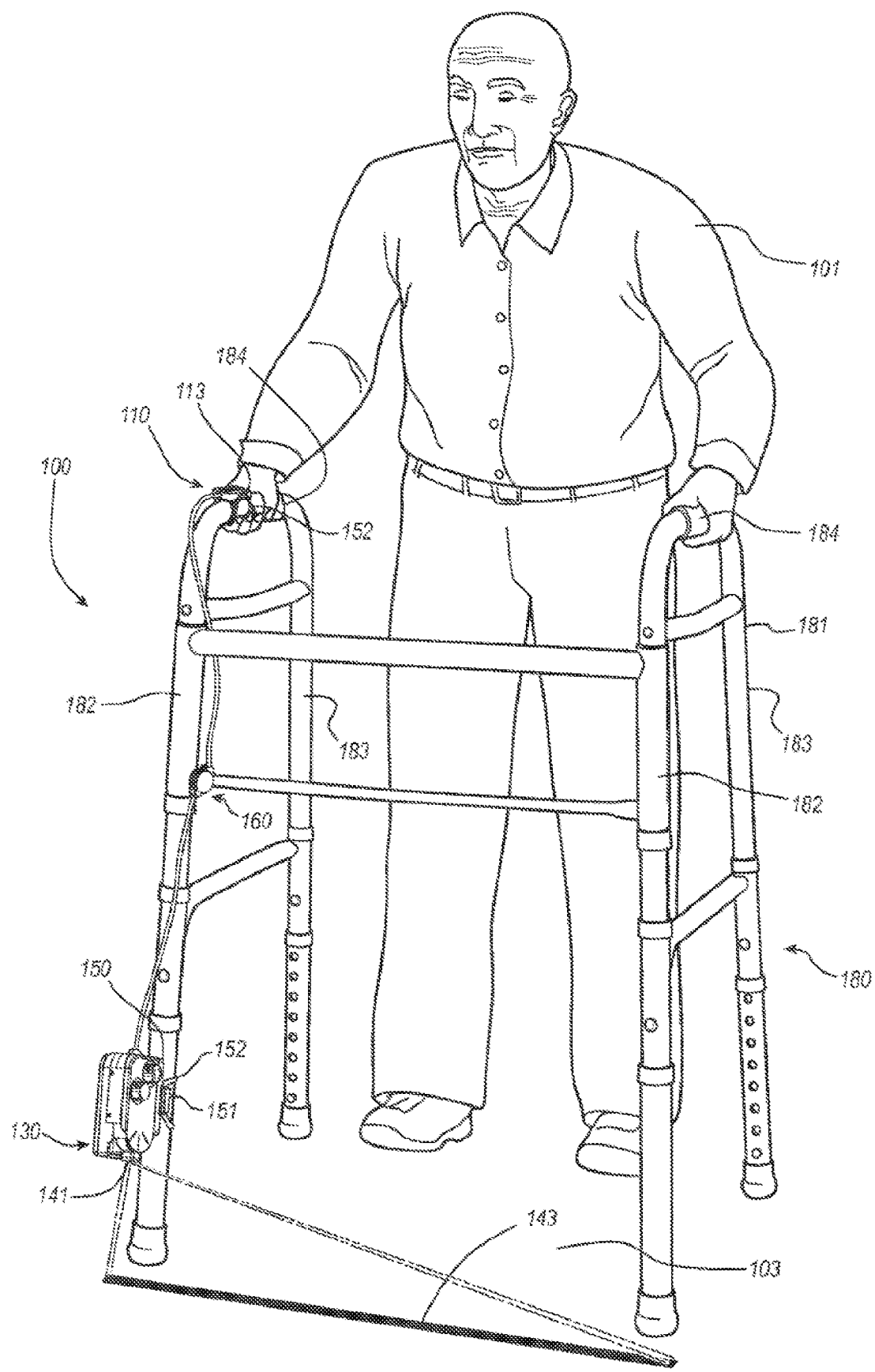
FIG. 4 is a perspective view of the cueing device of FIG. 1 mounted to a walker.
Figure 5:
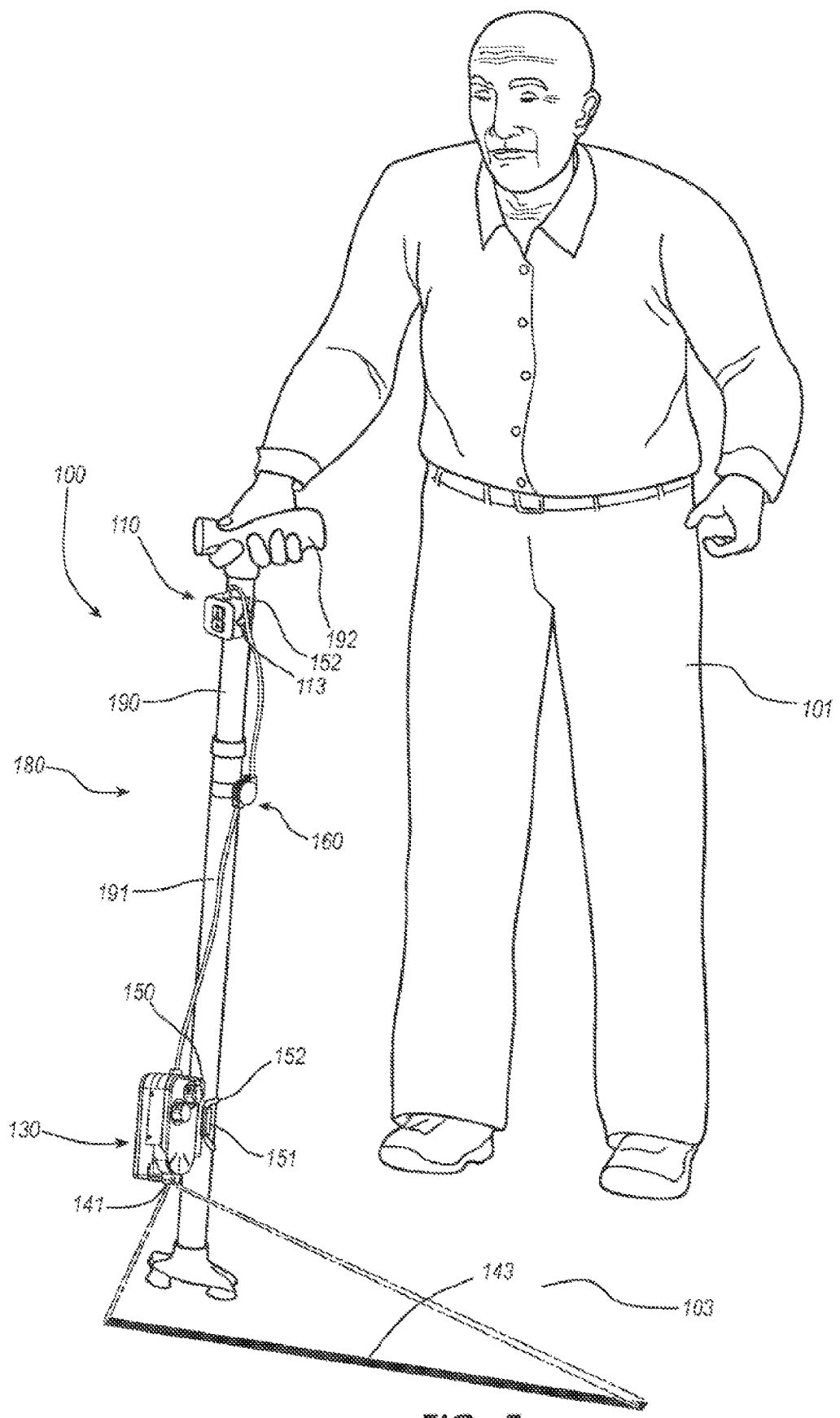
FIG. 5 is a perspective view of the cueing device of FIG. 1 mounted to a cane.

In the illustrated embodiment, the laser light source 141 is disposed at a distal portion of the cueing module 130. The laser light source 141 may include a laser diode configured to emit a red, orange, red-orange, blue, green, yellow, violet, etc. laser beam. As depicted in FIGS. 4 and 5, the laser beam may be projected onto a walking surface 103 as a projected line 143. In certain embodiments, the laser light source 141 may project two, three, four, or more projected lines 143. The projected line 143 may be in the form of a solid line, a segmented or dashed line, a dotted line, or any other suitable form that provides cueing for a user. In some embodiments, the cueing module 130 may include a laser light source potentiometer configured to adjust an intensity of the laser light source 141 such that the projected line 143 is visible by the user in darkened as well as lighted surroundings. In another embodiment, the cueing module 130 may include a light sensor that is configured to automatically adjust the intensity of the laser light source 141 dependent upon the lighting of the surroundings.

As depicted in the illustrated embodiment of FIGS. 1-2, the laser light source 141 may be disposed within a holder 149 and configured to be rotatably adjusted relative to a central longitudinal axis of the cueing module 130. The laser light source 141 may be in a neutral position when the laser light source 141 is aligned with the central longitudinal axis of the cueing module 130. The laser light source 141 may be in a forward position when it is rotationally adjusted forwardly up to about 80 degrees such that the laser light source 141 may project forward of the central longitudinal axis. The laser light source 141 may be in a rearward position when it is rotationally adjusted rearwardly up to about 80 degrees such that the laser light source 141 may project rearward of the central longitudinal axis. The position of the laser light source 141 may be indicated by a position indicium 142. The position indicium 142 may be of any suitable form, such as a protruding line, a groove, a printed line, etc.

The power switch 132 may be disposed at a proximal end of the cueing module 130 or at any other suitable surface. The power switch 132 may be in the form of a rocker switch where the cueing module 130 and the activation module 110 are powered on when the power switch 132 is depressed toward one side and powered off when the power switch 132 is depressed toward an opposite side. In other embodiments, the power switch 132 may be in the form of any suitable on/off type of switch, such as a pushbutton, toggle, motion sensor, etc. The micro USB port 133 may be disposed at a proximal end of the cueing module 130 or at any other suitable location. The micro USB port 133 may be configured to receive a micro USB connector 162 of the cable 160. The power source 147 may be disposed within the housing 131. The power source 147 may be a battery pack of one, two, three, or more rechargeable batteries. The power source 147 may be recharged through the micro USB port 133 and the cable 160 when the cable 160 is coupled to the cueing module 130 at one end and a power supply at the opposite end. Certain components of the cueing module 130 may alternatively be included in the activation module 110. For example, the power switch 132, the metronome potentiometer 138, the speaker volume potentiometer 138, etc. may be included in another embodiment of a cueing device.

FIG. 1 depicts the cable 160 of the illustrated embodiment of the cueing device 100. The cable 160 is shown to include the USB connector 161, the micro USB connector 162, an adjustable member 163, and an elongate insulated wire 164. The cable 160 is configured to provide electrical communication between the activation module 110 and the cueing module 130. The USB connector 161 is disposed at one end of the insulated wire 164 and configured to couple with the USB port 112 of the activation module 110. The USB connector 161 is also configured to couple with an external device such as a battery charging source, an external control device (e.g, smart phone), etc. The micro USB connector 162 is disposed at an opposite end of the insulated wire 164 and configured to couple with the micro USB port 133 of the cueing module 130. The adjustable member 163 is coupled to the insulated wire 164 and configured to automatically adjust a length (longer or shorter) of the cable 160 as the distance between the activation module 110 and the cueing module 130 changes. The adjustable member 163 may be configured to remove slack of the cable 160 to prevent the cable 160 from being inadvertently snagged when the cueing device 100 is in use. In the depicted embodiment, the adjustable member 163 is in the form of a retractable reel. In other embodiments, the cable 160 may include any suitable type of adjustable member 163, automatic or manual, such as a ratchet mechanism, a buckle, etc.

In another embodiment, the cueing device 100 may include sensors configured to monitor a user's walking speed, number of steps taken, number of FOG events, time utilization of the cueing device 100, etc. The sensors may be disposed in either the activation module 110 and/or the cueing module 130. Alternatively, the sensors may be couple to the user and electronically coupled to the cueing device 100 using hardwire or wireless communication techniques. Data collected by the sensors may be stored in a memory of the cueing device 100 or a removable memory member and subsequently up loaded to a computer, smart phone, etc. for analysis. Alternatively, the data may be up loaded to a computer, smart phone, etc. from the sensors on a real time basis using hardwire or wireless communication techniques.

Figure 3:
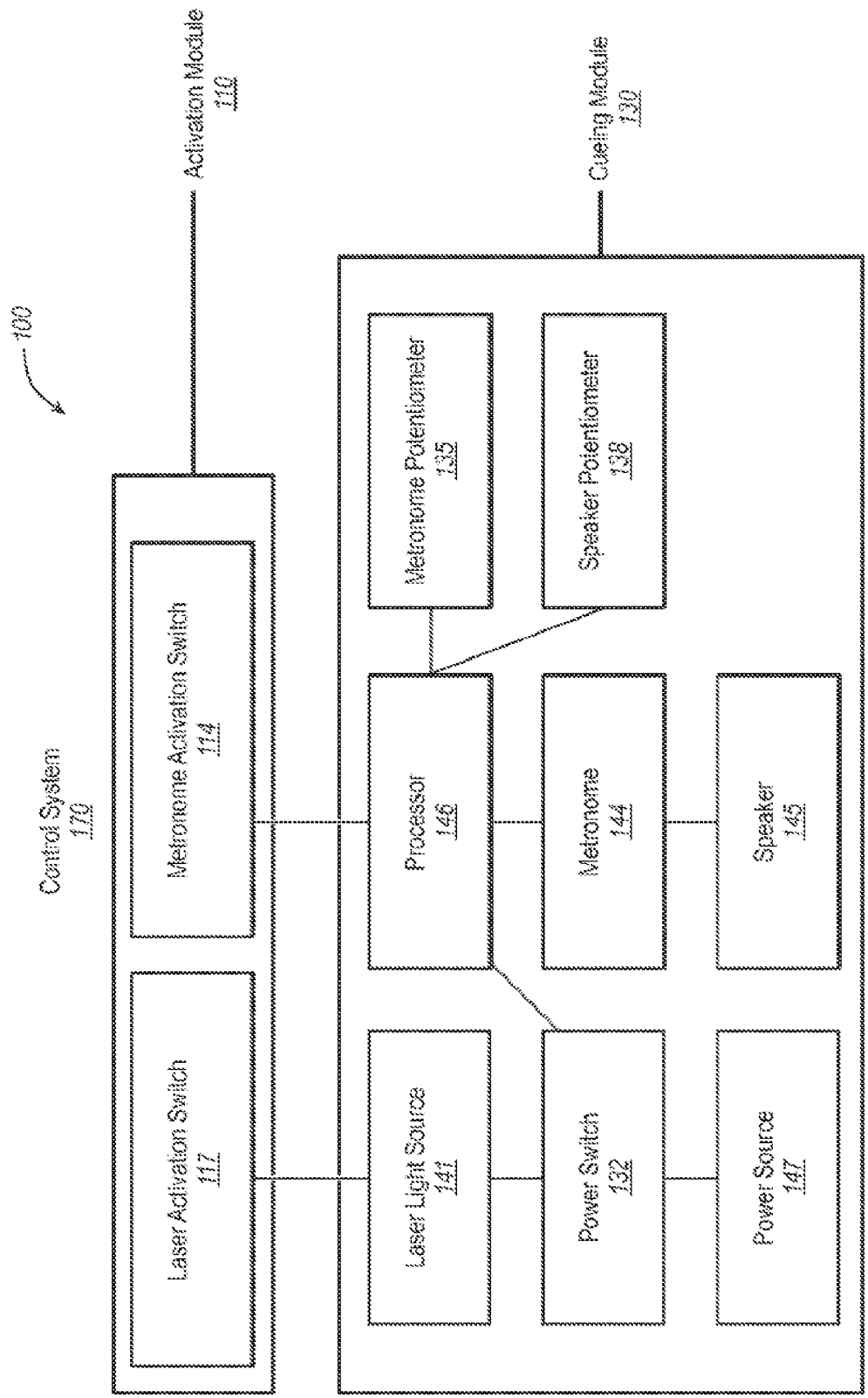
FIG. 3 is a block diagram of a control system of the cueing device of FIG. 1.

FIG. 3 is a block diagram of a control system 170 of the cueing device 100. The control system 170 includes various components of the activation module 110 and the cueing module 130 as previously described. FIG. 3 illustrates the activation module 110 including the metronome activation switch 114 and the laser activation switch 117. The laser activation switch 117 is in electrical communication with the laser light source 141 of the cueing module 130. When the laser activation switch 117 is actuated by the user, the laser light source 141 is activated. The metronome activation switch 114 is in electrical communication with the processor 146 of the cueing module 130. The processor 146 may be in electronic communication with the metronome 144. In another embodiment, the processor 146 and the metronome 144 may be an integrated unit. The metronome potentiometer 135 is in electronic communication with the processor 146 and the metronome 144. The speaker volume potentiometer 138 is in electronic communication with the processor 146 and the speaker 145. The power source 147 is in electrical communication with the power switch 132 such that when the power switch 132 is actuated, power can be supplied to the laser light source 141, the processor 146, the metronome 144, and the speaker 145.

FIG. 4 illustrates the cueing device 100 coupled to an assistive mobility device 180. In the illustrated embodiment of FIG. 4, the assistive mobility device 180 is in the form of a walker 181. The cueing device 100 is shown coupled to the walker 181 with the cable 160 extending between the modules 110, 130. The walker 181 includes a pair of forward legs 182, a pair of rearward legs 183, and a pair of handle bars 184 configured to be gripped by a user 101. As illustrated, the activation module 110 is adjustably coupled to an upper portion of the walker 181 adjacent the left or right handle bar 184 such that the activation module 110 is within easy reach of a finger of the user 101. The activation module 110 may be coupled to the walker 181 using the mushroom-shaped projections 113 and the elastomeric member 152. Other techniques of coupling, such as hook-and-loop bands, adhesive, buckled straps, etc., are within the scope of this disclosure.

The cueing module 130 can be adjustably coupled to a lower portion of the left or right forward leg 182 of the walker 181. In other embodiments, the cueing module 130 may be adjustably coupled to a lower portion of a left or right back leg of the walker 181. The cueing module 130 may be coupled to the walker 181 using the mounting bracket 150. The mounting bracket 150 may be coupled to the walker 181 through use of the elastomeric member 152 coupled to hooks 151 disposed on sides of the mounting bracket 150. Other techniques of coupling, such as hook-and-loop bands, adhesive, buckled straps, etc., are with the scope of this disclosure.

The height of the cueing module 130 above the walking surface 103 can be adjusted such that intensity and the length of the projected line 143 can be set to be easily visible by the user 101. The position of the projected line 143 relative to the walker 181 can be adjusted by rotating the laser light source 141 forward to position the projected line 143 forward of the walker 181 such that the user 101 may be prompted to take strides longer than when the laser light source 141 is positioned in the neutral position. The laser light source 141 can be rotated rearwardly to position the projected line 143 rearward of the forward legs 182 such that the user 101 may be prompted to take strides shorter than when the laser light source 141 is positioned in the neutral position. The cueing module 130 can be oriented such that the laser light source 141 projects either to the left or to the right.

FIG. 5 illustrates the cueing device 100 coupled to an assistive mobility device 180. In the illustrated embodiment of FIG. 5, the assistive mobility device 180 is in the form of a cane 190. The cueing device 100 is shown coupled to the cane 190 with the cable 160 extending between the modules 110, 130. The cane 190 includes a shaft 191 and a handle 192 disposed at a proximal end of the shaft 191 and configured to be gripped by the user 101. As illustrated, the activation module 110 is adjustably coupled to an upper portion of the shaft 191 adjacent the handle 192 such that the activation module 110 is within easy reach of a finger of the user 101. The activation module 110 may be coupled to the cane 190 using the mushroom-shaped projections 113 and the elastomeric member 152. Other techniques of coupling, such as hook-and-loop bands, adhesive, buckled straps, etc., are with the scope of this disclosure.

The cueing module 130 can be adjustably coupled to a lower portion of the shaft 191 of the cane 190. The cueing module 130 may be coupled to the cane 190 using the mounting bracket 150. The mounting bracket 150 can include a slide receiver (not shown) configured to slidingly receive a slide 148 of the cueing module 130. The mounting bracket 150 may be coupled to the cane 190 through use of the elastomeric member 152 coupled to hooks 151 disposed on sides of the mounting bracket 150. Other techniques of coupling, such as hook-and-loop bands, adhesive, buckled straps, etc., are with the scope of this disclosure.

The height of the cueing module 130 above the walking surface 103 can be adjusted such that the intensity and the length of the projected line 143 can be set to be easily visible by the user 101. The position of the projected line 143 relative to the cane 190 can be adjusted by rotating the laser light source 141 forward to position the projected line 143 forward of the cane 190 such that the user 101 may be prompted to take strides longer than when the laser light source 141 is positioned in the neutral position and the projected line 143 extends outwardly from the shaft 191. The laser light source 141 can be rotated rearwardly to position the projected line 143 rearward of the shaft 191 such that the user 101 may be prompted to take strides shorter than when the laser light source 141 is position in the neutral position. The cueing module 130 can be oriented such that the laser light source 141 projects either to the left or to the right to facilitate right-handed and left-handed use of the cane 190 by the user 101.

In use, a cueing device can be coupled to the assistive mobility device. An activation module can be coupled adjacent the finger of a user to an upper portion of the assistive mobility device. A cueing module may be coupled to a lower portion of the assistive mobility device. The height of the cueing module relative to a walking surface can be adjusted to allow for easy visualization of a projected line on the walking surface by the user. A cable may be coupled to the activation module at one end and the cueing module at the opposite end such that the modules are in electrical communication. A laser light source may be oriented in the neutral position where the projected line is projected in a plane of the longitudinal axis of the cueing module. Alternatively, the laser light source may be oriented forward or rearward of the longitudinal axis such that the projected line is projected either forward or rearward of the plane of the longitudinal axis.

The user may activate the laser light source by depressing a laser activation button with a finger to project the projected line onto the walking surface. Alternatively, or in parallel with activation of the laser light source, the user may depress the metronome activation button with a finger to activate the metronome. The cadence rate of the metronome can be increased or decreased by rotation of a knob by the user. The output volume of the speaker may be increased or decreased by rotation of a second knob by the user. Following activation of the laser light source and/or the metronome, the user may initiate walking with the aid of the assistive mobility device. Upon experiencing an episode of FOG, the user can be prompted or cued to take a step by the projected image and/or the output of the metronome from a speaker. In another embodiment, the laser light source and/or the metronome may be activated by the user following experiencing a FOG episode such that the user is prompted or cued to take a step.

Figure 6B:
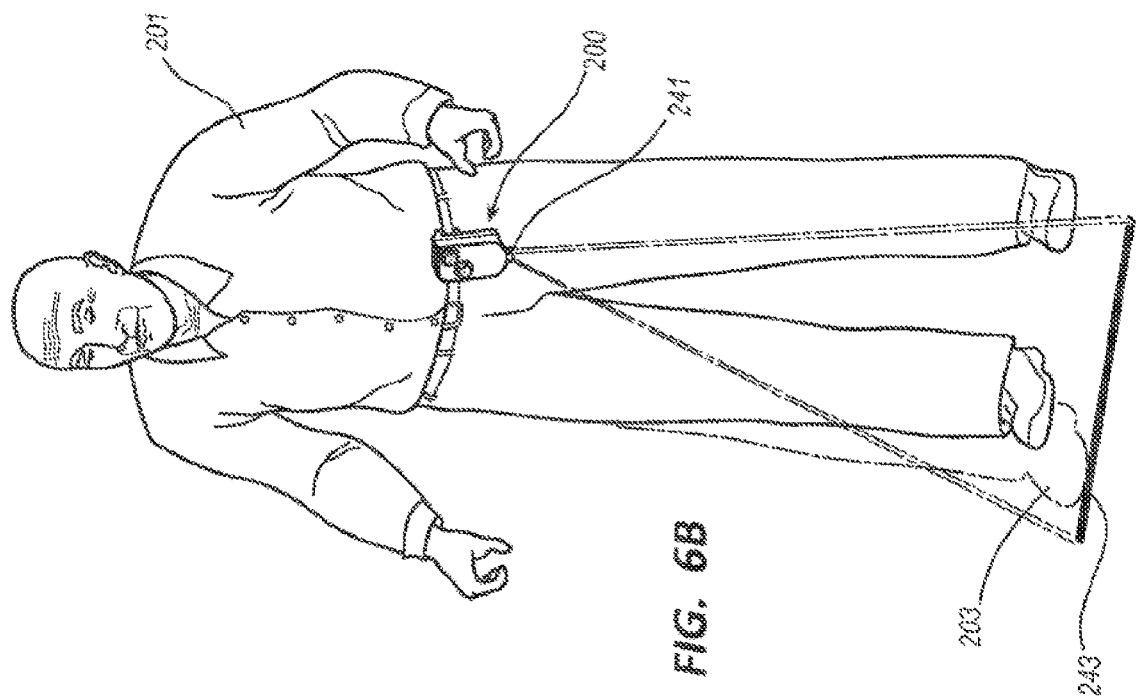
FIG. 6B is a perspective view of the cueing device of FIG. 6A mounted to a belt of a user.
Figure 6A:
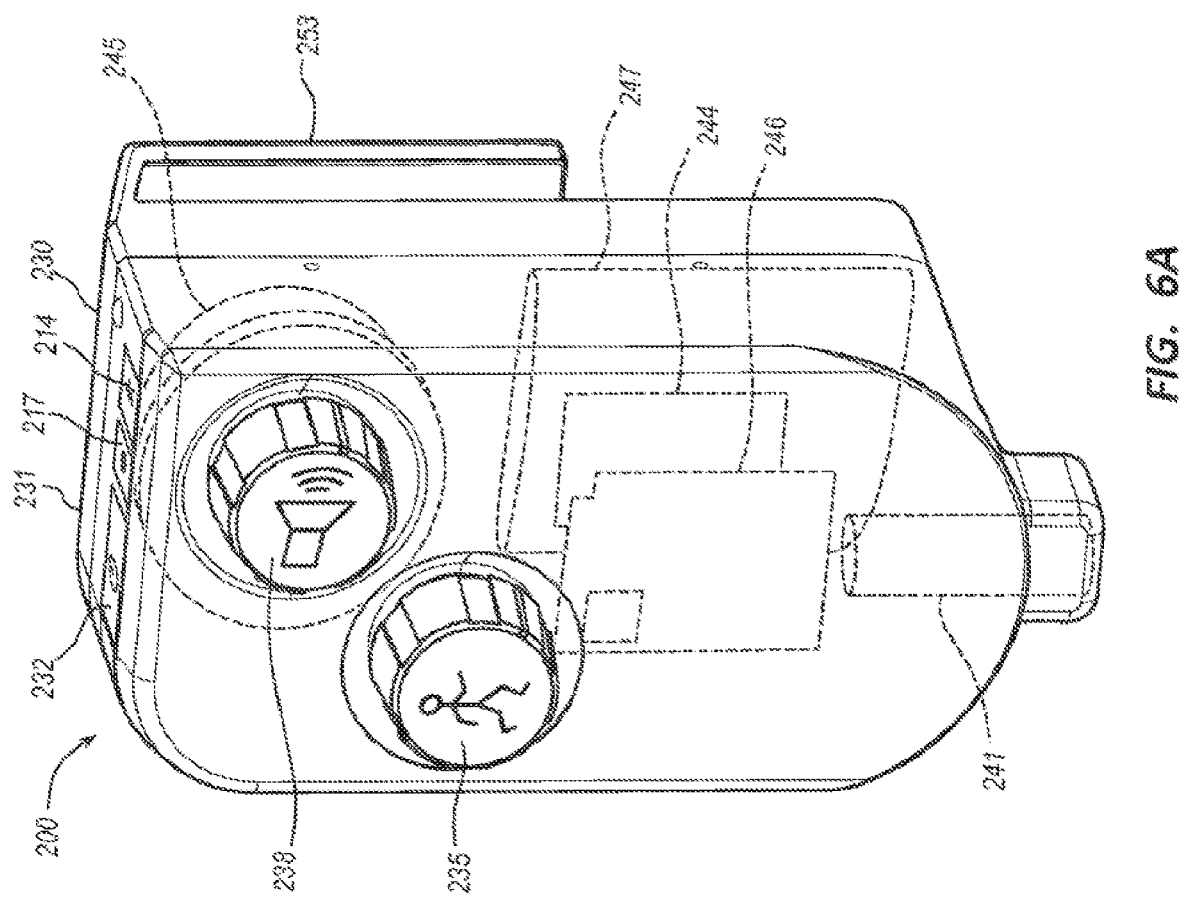
FIG. 6A is a perspective view of another embodiment of a cueing device.

FIGS. 6A-6B depict an embodiment of a cueing device 200 that resembles the cueing device 100 described above in certain respects. Accordingly, like features are designated with like reference numerals, with the leading digit incremented to "2." For example, the embodiment depicted in FIGS. 6A-6B includes a cueing module 230 that may, in some respects, resemble the cueing module 130 of FIG. 1. Relevant disclosure set forth above regarding similarly identified features thus may not be repeated hereafter. Moreover, specific features of the cueing device 100 and related components shown in FIGS. 1-5 may not b e shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the cueing device 200 and related components depicted in FIGS. 6A-6B. Any suitable combination of the features, and variations of the same, described with respect to the cueing device 100 and related components illustrated in FIGS. 1-5 can be employed with the cueing device 200 and related components of FIGS. 6A-6B, and vice versa. This pattern of disclosure applies equally to further embodiments depicted in sub sequent figures and described hereafter, wherein the leading digits may be further incremented.

FIGS. 6A-6B depict another embodiment of a cueing device 200. The cueing device 200 may be substantially an integration of the activation module 110 and the cueing module 130 of the cueing device 100. In the depicted embodiment of FIGS. 6A-6B, the cueing device 200 includes a cueing module 230. The cueing module 230 includes a housing 231, a power switch 232, a laser activation switch 217, a metronome activation switch 214, a metronome potentiometer 235, a speaker volume potentiometer 238, a metronome 244, a processor 246, a speaker 245, a laser light source 241, and a power source 247. The function of each of the listed features of the cueing module 230 is similar to the function of the like feature of cueing module 130 as previously described.

The housing 231 includes a belt hook 253 disposed on a back side of the housing 231. The belt hook 253 is configured to facilitate coupling of the cueing device 200 to a user 201 as depicted in FIG. 6B. The belt hook 253 may extend over a belt, a waistband, a pocket, etc. As illustrated in FIG. 6B, the cueing device 200 may be coupled to a mid-portion of the user 201 such that the cueing device 200 faces forward of the user 201. In another embodiment, the cueing device 200 may be coupled to a user's leg, chest, foot, etc. The laser light source 241 may be configured to project a projected line 243 onto a walking surface 203. The projected line 243 may extend forward of the feet of a user 201 and perpendicular to a direction of travel. A distance from the feet of the user 201 to the projected line 243 may be adjusted by adjusting a projection angle of the laser light source 241 relative to a transverse longitudinal axis of the cueing device 200.

In use, the user 201 may couple the cueing device 200 to a belt, waistband, or pocket using the belt hook 253. The power switch 232 may be activated. The laser activation switch 217 and/or the metronome activation switch 214 may be activated. The metronome potentiometer 235 may be adjusted to set a desired cadence. The speaker volume potentiometer 238 may be adjusted to set a desired output volume from the speaker 245. The angle of projection of the laser light source 241 may be adjusted to set a desired distance of the projected line 243 from the feet of the user 201. The cueing device 200 may cue or prompt the user 201 to take a step when the user 201 encounters a FOG episode.

FIGS. 7A-7B depict another embodiment of a cueing device 300. The cueing device 300 may be substantially an integration of the activation module 110 and the cueing module 130 of the cueing device 100. In the depicted embodiment of FIGS. 7A-7B, the cueing device 300 includes a cueing module 330. The cueing module 330 includes a housing 331, a power switch 332, a laser activation switch 317, a metronome activation switch 314, a metronome potentiometer 335, a speaker volume potentiometer 338, a metronome 344, a processor 346, a speaker 345, a laser light source 341, and a power source 347. The function of each of the listed features of the cueing module 330 is similar to the function of the like feature of cueing module 130 as previously described.

The housing 331 includes a wrist securement band 354 coupled to the housing 331. The securement band 354 is configured to facilitate coupling of the cueing device 300 to a user 301 as depicted in FIG. 7B. The securement band 354 may be any suitable band configured to be releasably secured to the user 101. For example, the securement band 354 may include hook- and loop material, a buckle, a resilient material, etc. The cueing device 300 may be coupled to either the left or right wrist of the user 301 such that the laser light source 341 faces forward of the user 301. The laser light source 341 may be configured to project a projected line 343 onto a walking surface 303. The projected line 343 may extend forward of the feet of the user 301 and perpendicular to a direction of travel. A distance from the feet of the user 301 to the projected line 343 may be adjusted by adjusting an angle of the lower arm relative to the body of the user 301.

In use, the user 301 may couple the cueing device 300 to the wrist using the securement band 354. The power switch 332 may be activated. The laser activation switch 317 and/or the metronome activation switch 314 may be activated. The metronome potentiometer 335 may be adjusted to set a desired cadence. The speaker volume potentiometer 338 may be adjusted to set a desired output volume from the speaker 345. The angle of projection of the laser light source 341 may be adjusted to set a desired distance of the projected line 343 from the feet of the user 301 by adjusting the angle of the lower arm relative to the body of the user 301. The cueing device 300 may cue or prompt the user 301 to take a step when the user 301 encounters a FOG episode.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

References to approximations are made throughout this specification, such as by use of the term "substantially." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. For example, where the term "substantially perpendicular" is recited with respect to a feature, it is understood that in further embodiments, the feature can have a precisely perpendicular configuration.

Similarly, in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

What is claimed is:

1. A device for treatment of a walking disorder, comprising:
    an activation module configured to be physically coupled and decoupled to a walking support structure or a waistband of a user at a first location, comprising:
    (i) an audible cueing activation switch; and
    (ii) a visual cueing activation switch; and
    a cueing module configured to be physically coupled and decoupled to the walking support structure or the waistband of the user at a second location that is different than the first location, comprising:
    (i) a metronome;
    (ii) a cadence control potentiometer coupled to the metronome;
    (iii) a volume control potentiometer; and
    (iv) a laser light source.

2. The device of claim 1, wherein the activation module is configured to be physically coupled and decoupled to the walking support structure of the user at the first location such that the audible cueing activation switch and the visual cueing activation switch are within reach of a finger of the user.

3. The device of claim 1, wherein the cueing module is configured to be physically coupled and decoupled to the walking support structure at the second location that is on a lower portion of the walking support structure.

4. The device of claim 1, wherein the laser light source is configured to project a laser light image onto a walking surface.

5. The device of claim 4, wherein the laser light image is a line.

6. The device of claim 1, wherein the laser light source is adjustable relative to a longitudinal axis of the cueing module.

7. The device of claim 6, wherein the laser light image is projected in axial alignment with a longitudinal axis of the cueing module when the laser light source is in a neutral projecting position, at an angle of from zero degrees to 80 degrees forward of the longitudinal axis when the laser light source is in a forward projecting position, and at an angle of from zero degrees to 80 degrees rearward of the longitudinal axis when the laser light source is in a rearward projection position.

8. The device of claim 1, wherein the laser light source is rotatably adjustable about a longitudinal axis of the cueing module.

9. The device of claim 1, wherein the activation module and the cueing module each comprise a securement member configured to enable physical coupling and decoupling to the walking support structure of the waistband of the user.

10. The device of claim 9, wherein the securement member comprises an elastomeric band.

11. The device of claim 1, wherein the audible cueing switch and the visual cueing switch comprise a pushable button.

12. The device of claim 11, wherein the pushable button comprises an indicium.

13. The device of claim 1, wherein the cadence control potentiometer and the volume control potentiometer comprise a knob configured to be rotated by one or more fingers of the user.

14. The device of claim 1, wherein the cadence control potentiometer is configured to adjust an output rate of the metronome.

15. The device of claim 1, wherein the metronome is configured to wirelessly communicate with any one of a headphone, ear buds, smart phone, tablet, and hearing aid.

16. The device of claim 1, wherein the volume control potentiometer is coupled to a speaker disposed within the cueing module, and wherein the volume control potentiometer is configured to adjust the output volume of the speaker.

17. The device of claim 1, further comprising a cable disposed between the activation module and the cueing module to electronically couple the activation module to the cueing module.

18. The device of claim 17, wherein a length of the cable is adjustable.

19. The device of claim 1, wherein the activation module and the cueing module are electronically coupled through wireless communication.

20. The device of claim 1, wherein the cueing module further comprises a power switch.

21. The device of claim 1, wherein the activation module and the cueing module are integrated into a control module.

22. The device of claim 21, wherein the control module is coupled to the user and disposed at any one of the user's waist, wrist, leg, chest, and head.

* * * * *